United States Patent [19]

Sugihara

[11] Patent Number: 4,738,784
[45] Date of Patent: Apr. 19, 1988

[54] FLOTATION DEVICE

[76] Inventor: Kazutoyo Sugihara, 964-38, Niihashi, Gotenba City, Shizuoka Pref., Japan

[21] Appl. No.: 881,595

[22] Filed: Jul. 3, 1986

[51] Int. Cl.$^4$ .............................................. B01D 21/01
[52] U.S. Cl. ................................... 210/705; 209/169; 209/170; 210/221.2
[58] Field of Search ............... 210/609, 696, 703, 704, 210/705, 198.1, 205, 206, 207, 208, 209, 221.1, 221.2; 209/168-170, 166

[56] References Cited

U.S. PATENT DOCUMENTS 4,198,294  4/1980  Deane .................................. 210/704
4,203,837  5/1980  Hoge et al. .......................... 209/166

Primary Examiner—Frank Sever
Attorney, Agent, or Firm—Gifford, Groh, VanOphem, Sheridan, Sprinkle and Dolgorukov

[57] ABSTRACT

A flotation device provided with a raw water tank; a flotation tank thereto the flowing of raw water from said raw water tank is generated by a water level differential; a stirring apparatus for air mixing located at flowing passage of raw water flows from said raw water tank to said flotation tank; a chemicals supply apparatus adding the cationic polymer coagulant at the upper stream side and the anionic polymer coagulant at the lower stream side of said stirring apparatus of said flowing passage; a gas supply apparatus feeding air with lowering the upper stream side of flowing passage at just before upper stream side of said stirring apparatus of said flowing passage.

29 Claims, 2 Drawing Sheets

FLOTATION DEVICE

The divers purpose and advantages of the invention and a better understanding thereof may be had by reference to the following description taken in conjunction with the accompanying drawing in which:

DETAILED DESCRIPTION OF THE INVENTION

1. Field of the Invention

Figure 1:
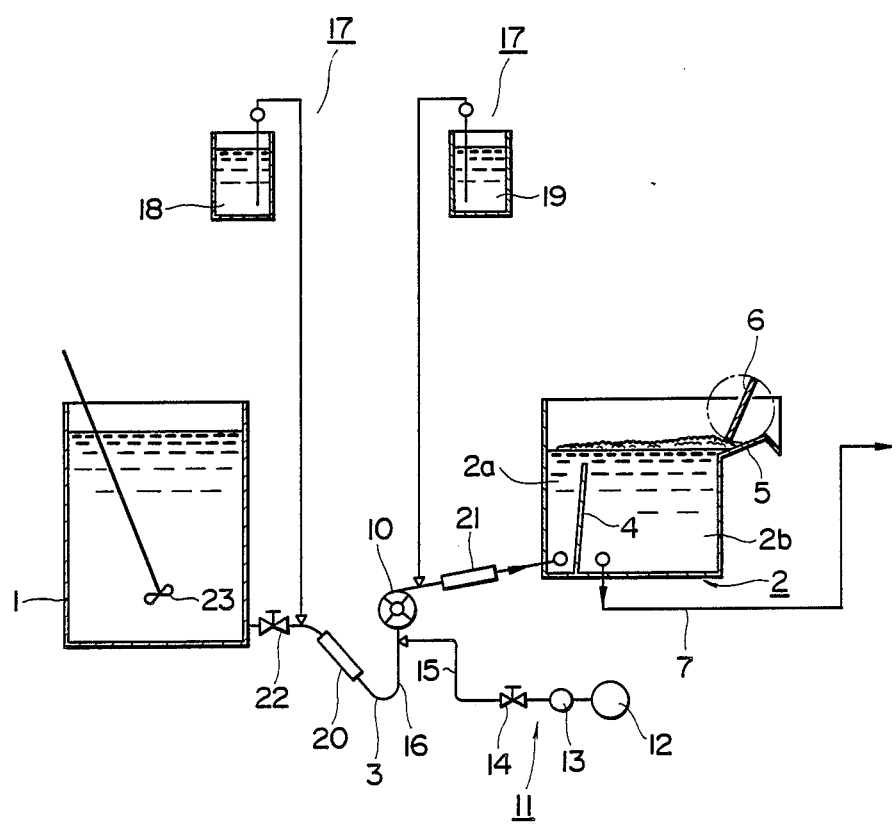
FIG. 1 is a schematic mechanical view of an embodiment of the present invention.

This invention relates to a floatation device to float and separate the suspended and settling solids contained in waste water.

2. Prior Art

It is conventionally known that there are two types of floatation device such as (a) an air bubble precipitation type, and (b) an air bubble contact type.

However, there were disadvantages in the air bubble precipitation type that it costs expensive because of it's complicated structure and it needed a large locating area.

Further, there were disadvantages in the air bubble contact type that the floating velocity in it's operation was very slow and it needed a large setting area.

Therefore, as a modification of above described air bubble contact type, a development of a device has taken place circulating a part of the treated water to generate air bubbles in this circulating water, mixing the circulating water containing air bubbles with waste water to be treated to bring the floc in the waste water into contact with air bubbles in circulating water to floatate said solids.

However, the condition of generating air bubbles having been influenced by the velocity of flow of the circulating water, it must to accelerate the flow to bubble up in abundance, therefore the circulating amount increased and that induced the liquid movement within a floating tank, accordingly there occured a disadvantage of a bad segregation of the floc which caused the carry-over of the floc within the treated water that brought a bad treatment efficiency.

As a modification of this air bubble contact type, it is taking place a development of a device without using circulating water as in the above mentioned device, providing with a pump to the passage between a fixed-quantity tank keeping the raw water to be treated and the floatation tank, together with sending the raw water directly to the floatation tank by this pump, simultaneously, sucking air from the upwarding hole connecting to outer air into the flowing passage by the suction power of the abovementioned pump located at the flowing passage of the upper stream side of the pump, intermixing it within the raw water, thus, sending the raw water intermixed air to floating tank to float the flocs in the raw water.

However, this device had following disadvantages, that it could not function well but only under the rare condition that a great deal of foaming agent such as surface-active agent having been mixed in advance to be able to generate steady air bubbles continuously, and under the other conditions, the air suction-mixing was not achieved sufficiently, and even if the air bubbles were generated at suction side, they were destroyed immediately so the gas and the liquid were separated, causing a surging phenomenon of a pump whereby the floatation efficiency is lowered. Further, the device had other disadvantage bringing upon the lowering of treating efficiency, that is, increasing the suction power of the pump to increase air suction volume, the passing velocity of raw water accelerated accordingly, which made it difficult to control the flow rate and happened surging more violently and generated liquid moving within the floating tank.

The purpose of this invention is to provide a floatation device whereof the disadvantages of a conventional device were eliminated, and more particularly to provide a floatation device whereof a full floatation efficiency are achieved with a simple structure further modifying beforementioned, previously known air bubble contact type, unnecessitating of circulating water, without generating formentioned troubles even if containing only a small amount of foaming agent in raw water.

To accomplish above mentioned purpose, the present invention is caracterized of providing with a raw water tank; a floatation tank thereto the flowing of raw water from said raw water tank is generated by a water level differential; a stirring apparatus for air mixing located at flowing passage of raw water flows from said raw water tank to said floatation tank; a chemicals supply apparatus adding the cationic polymer coagulant at the upper stream side and the anionic polymer coagulant at the lower stream side of said stirring apparatus of said flowing passage; a gas supply apparatus feeding air with lowering the upper stream side of flowing passage at just before upper stream side of said stirring apparatus of said flowing passage.

DETAILED DESCRIPTION OF THE PREFERRED EMBODIMENT

One of the embodiment of the present invention will be explained with reference to the accompanying drawings.

With reference to FIG. 1, 1 is a raw water tank keeping the raw waste water liquid to be treated or pre-treated one such as reaction process or neutralization process (both liquids are written as raw water); 2 is a floatation tank; 3 is a flowing passage comprising of a conduit that flows the water from raw water tank 1 to a floatation tank 2, the flowing of the raw water at flowing passage 3 is generated by the potential energy of the water level differential between the raw water tank 1 and the floatation tank 2.

4 is a partition plate devides the floatation tank 2 to the floating tank 2a and the separating tank 2b, 5 is a scum outlet port to take out the scum separated with the separation tank 2b, 6 is a skimmer scrapes the floated and separated scum out to scum outlet port 5, 7 is a discharge pipe to discharge the treated water after floated the scum from the raw water, from lower part of the separating tank 2b to outside.

At the middle of the abovementioned flowing passage 3, a stirring apparatus 10 for air mixing is provided. As for the stirring apparatus 10, it is preferable such as being rotated by the power as shown in FIG. 1, it is also preferable being mixed by pipe mixer. 11 is a gas supply apparatus to feed air just before the upper stream side of said stirring apparatus 10 of this flowing passage 3, consisting of a compresser 12, a pressure reducing valve 13, a regulating valve 14 and a supply pipe 15.

As for the flowing passage 3, it is preferable to be provided with a bending portion 16 having the inclination to be in low position the upper stream side and to be in high position the lower stream side, not to flow backward the fed air to the upper stream side at before and behind of said air feeding portion.

17 is a chemicals supply apparatus to add the coagulant into the flowing passage 3 to coagulate the floc within the raw water, the Y-agent, a chemicals such as polymer coagulant that causes the fall of surface electric potential and blockades the hydrophilic radicals to enable easy to coagulate the hydrophobic floc, is added from the Y-agent tank 18 to the upper stream side of a stirring apparatus 10, and the Z-agent, a chemicals such as polymer coagulant which forms and grows the floc, is added from the Z-agent tank 19 to the lower stream side of the stirring apparatus 10.

20 and 21 are the stirring apparatus consisting of such as the pipemixers located at the lower stream side of the feeding position of each Y-agent and Z-agent, mixing each agent with the raw water.

22 is a flow rate controll valve located at the uppermost side of the flowing passage 3. 23 is a stirring instrument preventing settlement of settling solids or giving the pre-treatment conditions within the raw water tank 1.

The operation of the device illustrated in FIG. 1 will be described below.

Beginning with the cooperative adjustment between the open degree of the flow rate control valve 22 according to the water level differential between the raw water tank 1 and the floatation tank 2 and the open degree of the reducing valve 13 and cotrolling valve 14 of the gass supply apparatus 11, and next, the flowing of the raw water from the raw water tank 1 and feeding of air from the gas supply apparatus 11 and addition of the chemicals liquid from the chemicals supply apparatus 17 to the floatation tank 2 at the flowing passage 3 are started.

The Y-agent from the Y-agent tank is added into the raw water and mixed within the stirring apparatus 20 to fall the surface electric potential of the suspended and settling solids contained within the raw water and blockaded the hydrophilic radicals to enable easy to coagulate the flocs, and at further lower stream side, air is fed to the raw water and stirred at the stirring apparatus 10 to be intermixed the fine air bubbles into the raw water, a large amount of fine air bubbles begin to attach to the hereinbefore described solids. The Z-agent from the Z-agent tank 19 is added at further lower stream side and stirred at the stirring apparatus 21, the coagulant flocs attaching to the fine air bubbles, becoming to bubbles scum easy to float until reaching to the floating tank 2a. Accordingly arriving at the bottom of the floating tank 2a, the bubbles scum start to float immediately, and swept away on the outer layer of the separating tank 2b, pressed, superdensifized, and finally scraped away by the skimmer 6 from the scum outlet port 5. Thus the raw water, whereof the suspended and settling solids are floated and separated as the bubbles scum together with the bubbles, are discharged as the treated waste water from lower part of the separating tank 2b through the dischrge pipe 7 to outside.

It is also preferable mixing the foaming agent or giving pre-treatment into the raw water tank 1.

The surveyed values according to the hereinbefore described device are below;

| Example 1 | | |
|---|---|---|
| raw water | waste water containing glass abrasive | |
| foaming agent | Linear Alkylbenzenesulfonic acid soda | 30 ppm |
| Y-agent | Cationic polymer coagulant | 20 ppm |
| Z-agent | Anionic polymer coagulant | 10 ppm |
| Water supply amount | 0.5 t/H | |
| Results | | |
| | pH | SS |
| raw water | 7.5 | 500 ppm |
| treated water | 7.5 | 5 ppm |
| elimination rate | — | 99.0% |
| Example 2 | | |
| raw water | waste water of photographic development carbon | |
| pre-treatment | add 250 ppm of PAC(Polyaluminium-chloride) and a small amount of sulfuric acid to the raw water | |
| foaming agent | Linear Alkylbenzenesulfonic acid soda | 30 ppm |
| Y-agent | Cationic polymer coagulant | 20 ppm |
| Z-agent | Anionic polymer coagulant | 10 ppm |
| Water supply amount | 0.5 t/H | |
| Results | | |
| | pH | SS |
| raw water | 9.5 | 100 ppm |
| treated water | 6.8 | 5 ppm |
| elimination rate | — | 96% |

In addition, being flowed by utilizing the water level differential in the above mentioned embodiments, even if the compresser 12 of the gas supply apparatus 11 is under low pressure, it intermixes air sufficiently into the raw water. Accordingly, it is also available using the blower instead of the compresser. And it becomes evident that the foaming agent also needed extremely small amount as mentioned above.

Figure 2:
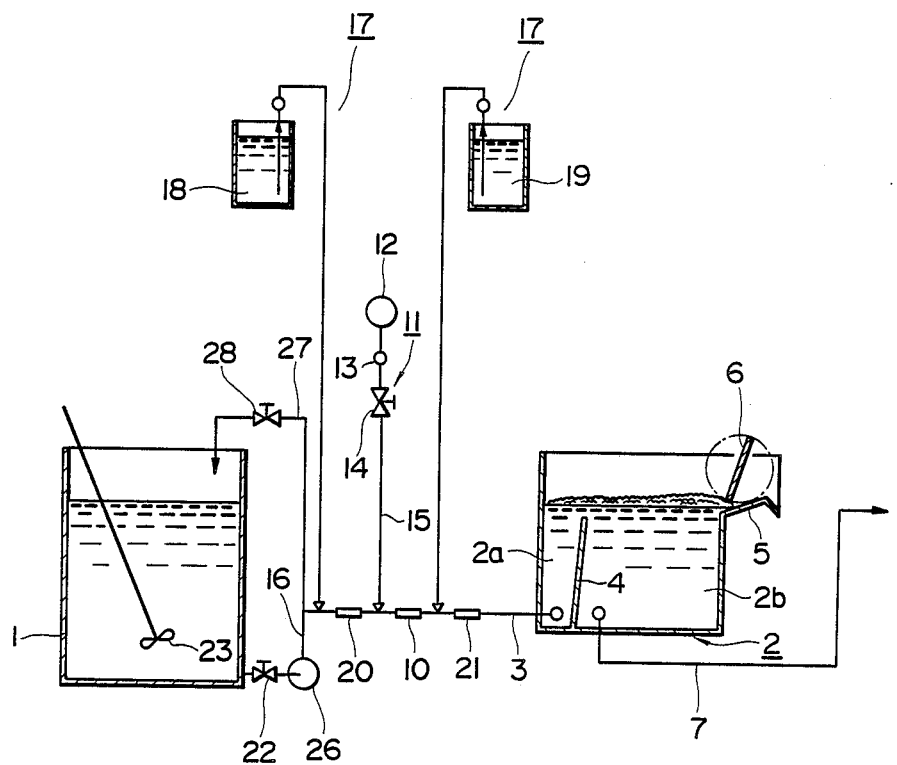
FIG. 2 is a schematic mechanical view of the modified embodiment.

Furthermore, instead of utilizing the water level differential to flow the raw water, it is also preferable, as shown in FIG. 2, using the low speed pump 26 located at the upper stream side (more upper position from Y-agent adding point ) of the flowing passage 3. In addition, 27 is a by-pass system for control of the amount of flowing water, 28 is a control valve.

Being constrcted as described above, the present invention has the following effects.

(1) Being no need of the circulating water as in the prior art, the present invention can prevent the lowering of treatment efficiency by the liquid movement within the separating tank.

(2) Without containing a large amount of foaming agent within the raw water to be treated, it is possible to float and separate sufficiently. And it never occurs surging.

(3) The bubbles scum are generated plentifully by the intermixing of Y-agent and Z-agent, and by the feeding of air at the gas supply apparatus 11, and by the stirring at the stirring apparatus 10 until the raw water arrives at the floating tank 2a. Accordingly, as soon as they reach to the floating tank 2a, the bubbles scum begin to float and separate, so the floatation efficiency is extreamly excellent and floating velocity is swift.

(4) Being unnecessary of the circulating system, and being not an air bubble precipitation type, the device requires a small setting area and it can be small-sized and lowered the cost.

(5) The speed of the flowing at the flowing passage 3 being enough in low, the compressor for feeding air can intermix air by low pressure, and it is also easy to control the flow rate of the raw water.

Having thus described the present invention by way of a typical embodiment thereof, what is claimed as new is as follows;

1. An apparatus for treating water containing separable contaminant, comprising means for reducing the amount of energy required for satisfactorily separating said contaminant from said water by floculation and floatation, said means including in combination:
   means for directing the flow of said water by supplying a head thereto;
   means for supplying a first flocculant to water in said flow directing means;
   downstream means for supplying air to said water and said first flocculant;
   means immediately further downstream for mixing said air, water and first flocculant;
   further downstream means for supplying a second flocculant to said admixed air, water and first flocculant; said first and second flocculants together being capable of associating with said separable contaminants to form a floc separable from said water; and
   means for separating said floc from said water.

2. The invention according to claim 1, wherein said flow directing means comprises a tank for untreated water upstream of said first flocculant supply means.

3. The invention according to claim 1, wherein said floc separating means comprises a flotation tank.

4. The invention according to claim 1, where in said first flocculant is a cationic polymer coagulant.

5. The invention according to claim 1, wherein said second flocculant is an anionic polymer coagulant.

6. The invention according to claim 1, wherein said first flocculant is one of a cationic and an anionic polymer coagulant, and said second flocculant is the other of an anionic and a cationic polymer coagulant.

7. The invention according to claim 1, wherein said mixing means comprises a static pipe mixer.

8. The invention according to claim 1, wherein said mixing means comprises a rotatable stirrer member in said flow directing means.

9. The invention according to claim 1, wherein said air supply means comprises an air compressor and a supply pipe connecting said compressor to said flow directing means.

10. The invention according to claim 1, wherein said flow directing means comprises a pump upstream of said first flocculant supply means.

11. The invention according to claim 1, wherein said flow directing means directs said flow by gravity.

12. The invention according to claim 1, wherein said apparatus further comprises water conditioning means upstream of said first flocculant supply means.

13. The invention according to claim 1, wherein said flow directing means comprises a static pipe mixer closely downstream of at least one of said first and second flocculant supply means.

14. The invention according to claim 1, wherein said apparatus further comprises means, upstream of said first flocculant supply means, for supplying a foaming agent to said water.

15. The invention according to claim 1, wherein said flow directing means generally comprises a closed conduit.

16. A method of treating water containing separable contaminant, comprising reducing the amount of energy required for satisfactorily separating said contaminant from said water by floculation and floatation, by the sequential steps of:
   directing a flow of water by supplying a head thereto;
   supplying a first flocculant to said flow of water;
   supplying air to said water and said first flocculant;
   mixing said air, water and first flocculant;
   supplying a second flocculant to said air, water and first flocculant; said first and second flocculants together being capable of associating with said separable contaminant to form a floc separable from said water; and
   separating said floc from said water.

17. The invention according to claim 16, wherein said floc separating step is carried out employing a flotation tank.

18. The invention according to claim 16, wherein said first flocculant is a cationic polymer coagulant.

19. The invention according to claim 16, wherein said second flocculant is an anionic polymer coagulant.

20. The invention according to claim 16, wherein said first flocculant is one of a cationic and an anionic polymer coagulant, and said second flocculant is the other of an anionic and cationic polymer coagulant.

21. The invention according to claim 16, wherein said mixing of said air, water and first flocculant is carried out employing a static pipe mixer.

22. The invention according to claim 16, wherein said mixing of said air, water and first flocculant is carried out employing a rotatable stirrer member.

23. The invention according to claim 16, further comprising generally closely containing said water and supplied constituents during said method.

24. The invention according to claim 16, wherein said air supplying step is carried out employing an air compressor and an air supply pipe connecting said compressor to said flow of water.

25. The invention according to claim 16, wherein said head is provided by pumping said water prior to said supply of said first flocculant to said water.

26. The invention according to claim 16, wherein said head is applied to said water by allowing said water to flow by gravity.

27. The invention according to claim 16, comprising the further step of conditioning said water prior to said step of supplying said first flocculant to said water.

28. The invention according to claim 16, further comprising passing said flow of water through a static pipe mixer immediately after at least one of supplying said first and supplying said second flocculants to said water.

29. The invention according to claim 16, further comprising the step of supplying a foaming agent to said water prior to supplying said first flocculant to said water.

* * * * *

UNITED STATES PATENT AND TRADEMARK OFFICE
CERTIFICATE OF CORRECTION

PATENT NO. : 4,738,784                         Page 1 of 3

DATED     : April 19, 1988

INVENTOR(S) : Kazutoyo Sugihara

It is certified that error appears in the above-identified patent and that said Letters Patent is hereby corrected as shown below:

Col. 1, line 4, delete "divers" and insert --diverse--;

line 18, delete "floatation" and insert --flotation--;

line 23, delete "floatation" and insert --flotation--;

line 54, delete "floatation" and insert --flotation--;

line 55, delete "floatation" and insert --flotation--.

Col. 2, line 5, delete "floatation" and insert --flotation--;

line 6, delete "disadventage" and insert --disadvantage--;

line 13, delete "floatation" and insert --flotation--;

line 14, delete "floatation" and insert --flotation--;

line 16, delete "floatation" and insert --flotation--;

line 18, delete "are" and insert --is--;

line 24, delete "caracterized" and insert --characterized--;

line 25, delete "floatation" and insert --flotation--;

UNITED STATES PATENT AND TRADEMARK OFFICE
CERTIFICATE OF CORRECTION

PATENT NO. : 4,738,784

DATED : April 19, 1988

INVENTOR(S) : Kazutoyo Sugihara

It is certified that error appears in the above-identified patent and that said Letters Patent is hereby corrected as shown below:

Col. 2, line 29, delete "floatation" and insert --flotation--;

line 41, delete "embodiment" and insert --embodiments--;

line 48, delete "floatation" and insert --flotation--;

line 50, delete "floatation" and insert --flotation--;

line 53, delete "floatation" and insert --flotation--;

line 54, delete "devides" and insert --which divides--.

Col. 3, line 11, delete "chemicals" and insert --chemical--;

line 16, delete "chemicals" and insert --chemical--;

line 24, delete "controll" and insert --control--;

line 35, delete "floatation" and insert --flotation--;

line 36, delete "controlling" and insert --regulating--;

line 37, delete "gass" and insert --gas--;

line 41, delete "floatation" and insert --flotation--;

UNITED STATES PATENT AND TRADEMARK OFFICE
CERTIFICATE OF CORRECTION

PATENT NO.  : 4,738,784
DATED       : April 19, 1988
INVENTOR(S) : Kazutoyo Sugihara It is certified that error appears in the above-identified patent and that said Letters Patent is hereby corrected as shown below:

Col. 3, line 43 after "tank", insert --18--;

line 66, delete "dischrge" and insert --discharge--.

Col. 4, line 47, delete "constrcted" and insert --constructed--;

line 63, delete "floatation" and insert --flotation--;

delete "extreamly" and insert --extremely--.

Col. 5, line 10, delete "floatation" and insert --flotation--;

line 33, delete "where in" and insert --wherein--.

Col. 6, line 9, delete "floatation" and insert --flotation--.

Signed and Sealed this

Twentieth Day of September, 1988

Attest:

DONALD J. QUIGG

Attesting Officer     Commissioner of Patents and Trademarks